UNITED STATES PATENT OFFICE.

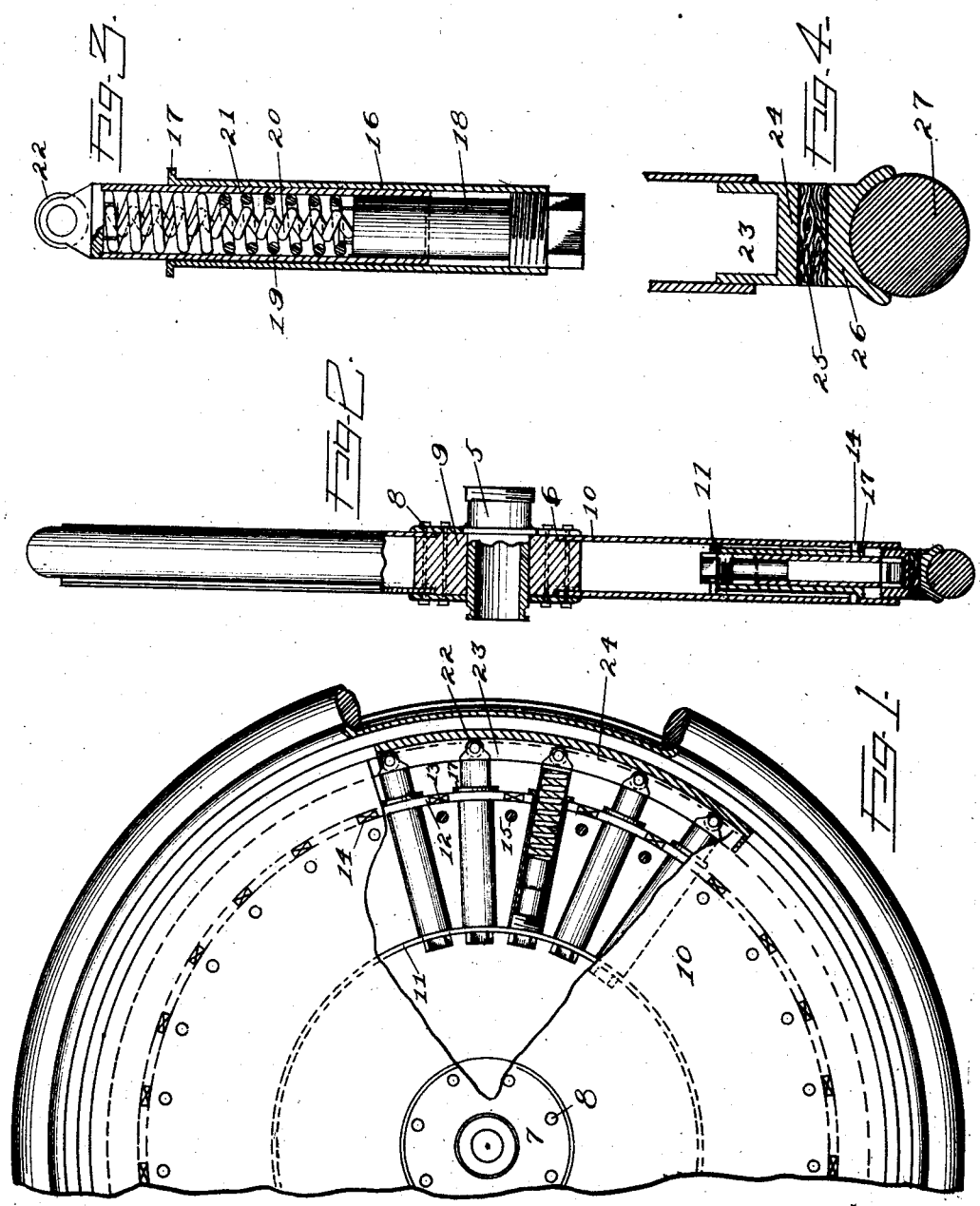

MARIUS MATHIESEN, OF SAN ANTONIO, TEXAS.

RESILIENT WHEEL.

1,037,949.  Specification of Letters Patent.  Patented Sept. 10, 1912.

Application filed October 4, 1911. Serial No. 652,865.

*To all whom it may concern:*

Be it known that I, MARIUS MATHIESEN, a citizen of the United States of America, residing at San Antonio, in the county of Bexar and State of Texas, have invented certain new and useful Improvements in Resilient Wheels, of which the following is a specification.

This invention relates to resilient wheels, and has for its object the provision of an improved device of this character constructed in such manner as to present a nonpuncturable surface to the road bed, while at the same time being capable of absorbing the shocks and jars incident to the passage of the vehicle over such road bed.

Further objects and advantages of the invention will be set forth in the detailed description which now follows.

In the accompanying drawing, Figure 1 is a view partly in side elevation and partly in section of a wheel constructed in accordance with the invention, Fig. 2 is a view partly in edge elevation and partly in section, Fig. 3 is a sectional view through one of the spokes, and Fig. 4 is a sectional view through the rim and tire.

Like numerals designate corresponding parts in all the figures of the drawing.

Referring to the drawing, the numeral 5 designates a hub having an integral flange 6 and a movable flange 7, bolts 8 serving to draw these flanges together, and to clamp between them a filling piece 9. Metal disks 10 have their inner edges clamped between the flanges and the filling piece. An inner ring 11 and an outer ring 12 are located between the disks 10. The outer ring carries transverse lugs 13 which pass through openings 14 in the disks. Bolts 15 pass through the disks and draw said disks toward each other, this action holding the disks firmly upon the lugs 13. The spokes comprise the sleeves 16, having flanges 17 at their outer ends which limit the inward movement of the sleeves through the ring 12. The angular heads (see Figs. 1 and 3) of plugs 18 pass through the inner rim. Plugs 18 are threaded into the inner ends of the sleeves 16. Springs 19 and 20 bear between the outer ends of the plugs 18 and the outer ends of tubular push rods 21. These push rods carry rollers 22 at their outer ends. These rollers travel in a channel 23 of a rim portion 24. The rim consists of portion 24, a wooden portion 25 and an outer channel portion 26 formed to receive a preferably solid rubber tire 27. The outer spring 19, which I term a compression spring, is compressed when put in the wheel, and its function is to maintain a definite pressure on the rim at all points and to cause the rim to occupy a position concentric with the hub when all load is relieved. These springs also help to carry the load when further compressed. Therefore, when the wheel is subjected to the load these springs keep the rim at a distance from the hub of the wheel in proportion to the degree that they are compressed.

The plugs 18 provide an air-tight closure for the inner ends of the sleeves 16, and the push rods 21 fit snugly within said sleeves. Therefore, as these push rods move inwardly they compress the air within the sleeves 16, and as they move outwardly they tend to create a vacuum in said sleeves 16. The compression of the air and the vacuum created will be directly in proportion to the amount of travel either way. This action tends to resist any sudden movement of the push rods and will act as a shock absorber and safety device. The roller and continuous channel structure shown in Fig. 1 at 23 and 24 permits relative vertical movement between the hub and rim portions, while always maintaining the requisite bearing between these parts. Furthermore, the provision of the disks entirely inclosing the spokes keeps out dust, mud, and other dirt, and at the same time provides the necessary strength to enable the wheel to withstand the enormous lateral pressure to which it is subjected in going around curves.

While the elements herein shown and described are well adapted to serve the purposes for which they are intended, it is to be understood that the invention is not limited to the precise construction set forth, but includes within its purview such changes as may be made within the scope of the appended claims.

Having described my invention, what I claim is:

1. A wheel of the character described, comprising a hub portion, a pair of metallic disks carried by said hub portion, an inner ring and an outer ring disposed between said disks, sleeves carried by said rings, tubular push rods slidably engaged in said sleeves, rollers carried by the outer ends of said push rods, springs disposed within said push rods for resisting the movement of the push rods into said sleeve, and a rim, comprising a channel member in which said rollers engage.

2. In a wheel of the character described, the combination with a hub and a rim, the interior face of said rim being continuously channeled, of a pair of metallic disks fixed to the hub and of such diameter as to extend to and lie upon each side of the rim, the outer portions of said disks sliding over the outer faces of said rim, a pair of concentric rings located between said disks, one of said rings having a plurality of transverse lugs formed thereon which pass through openings in the disks, a plurality of spokes comprising sleeves which pass through the outer ring and bear upon the inner ring, adjustable plugs threaded into the inner ends of said sleeves, the ends of said plugs passing through the inner ring, tubular push rods slidably mounted in the sleeves, springs bearing between said tubular push rods and said plugs, and rollers carried by the outer ends of said spokes and traveling in the channel of the rim.

In testimony whereof I affix my signature in presence of two witnesses.

MARIUS MATHIESEN.

Witnesses:
 J. H. GROVER,
 C. J. THOMSON.